United States Patent [19]
Beard, Jr.

[11] Patent Number: 6,079,295
[45] Date of Patent: Jun. 27, 2000

[54] CHAINSAW BLADE SHARPENER WITH STOP

[76] Inventor: Lloyd J. Beard, Jr., 365 Haley St., Vidor, Tex. 77662

[21] Appl. No.: 09/209,625

[22] Filed: Dec. 11, 1998

[51] Int. Cl.⁷ .................................................. B23D 63/16
[52] U.S. Cl. ................................................. 76/80.5; 76/36
[58] Field of Search ................................. 76/80.5, 31, 36

[56] References Cited

U.S. PATENT DOCUMENTS

| | | | |
|---|---|---|---|
| 2,415,137 | 2/1947 | Johnson | 76/80.5 |
| 2,707,409 | 5/1955 | Fitch | 76/80.5 |
| 2,813,438 | 11/1957 | Paradis et al. | 76/80.5 |
| 2,833,165 | 5/1958 | Irwin et al. | 76/80.5 |
| 2,900,850 | 8/1959 | Travis | 76/80.5 |
| 3,083,591 | 4/1963 | Travis | 76/80.5 |
| 5,107,726 | 4/1992 | Wilhite et al. | 76/80.5 |

FOREIGN PATENT DOCUMENTS

| | | | |
|---|---|---|---|
| 644796 | 7/1962 | Canada | 76/80.5 |
| 1440900 | 4/1966 | France | 76/80.5 |
| 889253 | 9/1953 | Germany | 76/80.5 |

*Primary Examiner*—Hwei-Siu Payer

[57] ABSTRACT

A chainsaw blade sharpening system is provided including a clamping assembly adapted for being mounted to a recipient surface and adapted to clamp opposite sides of a chainsaw blade. Also included is a file mounting assembly fixed with respect to the clamping assembly. Next provided is a file slidably coupled to the file mounting assembly. A chain stop is mounted on the file mounting assembly and is adapted for abutting a side of a tooth of the chainsaw blade opposite that which is sharpened by the file.

6 Claims, 4 Drawing Sheets

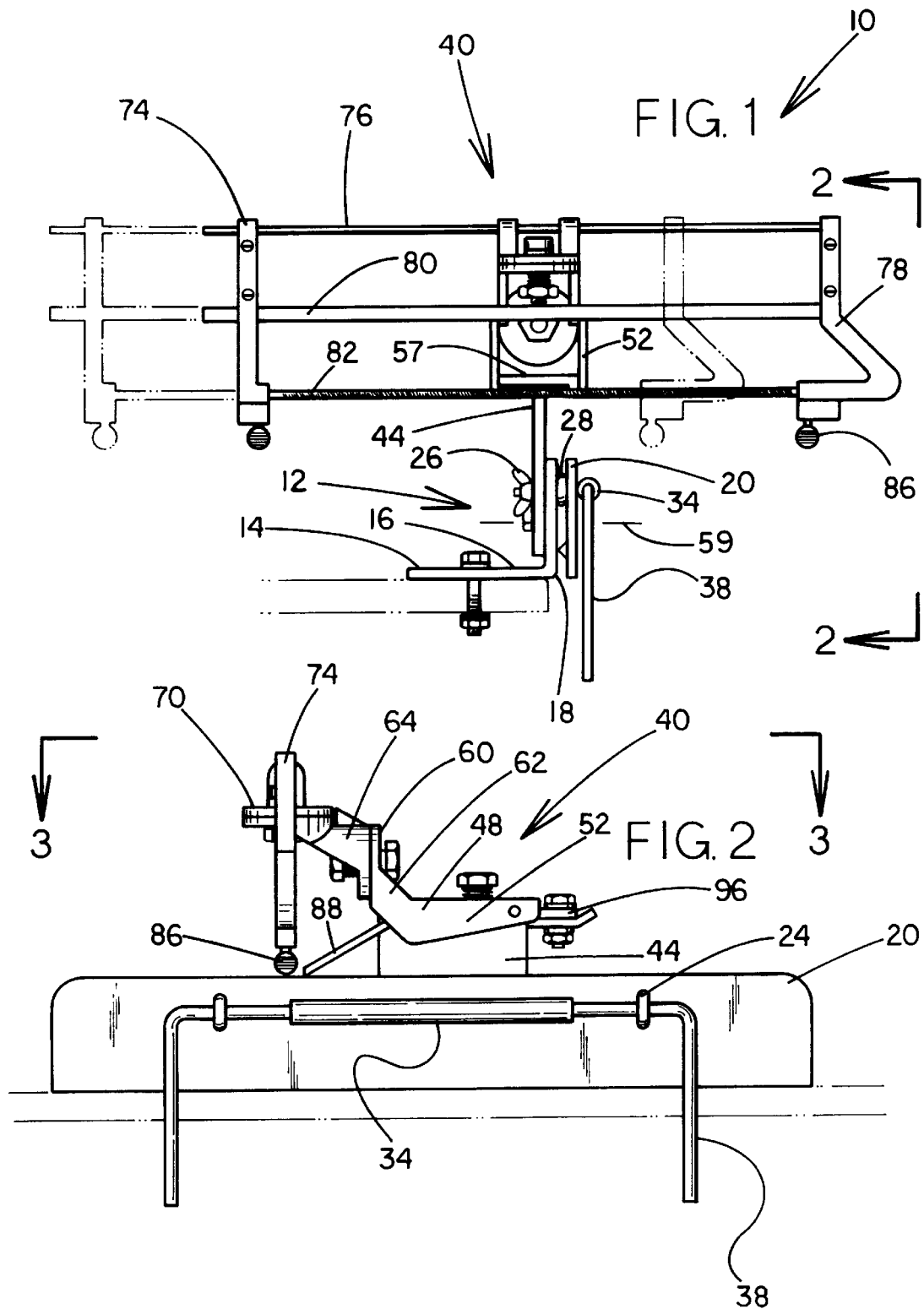

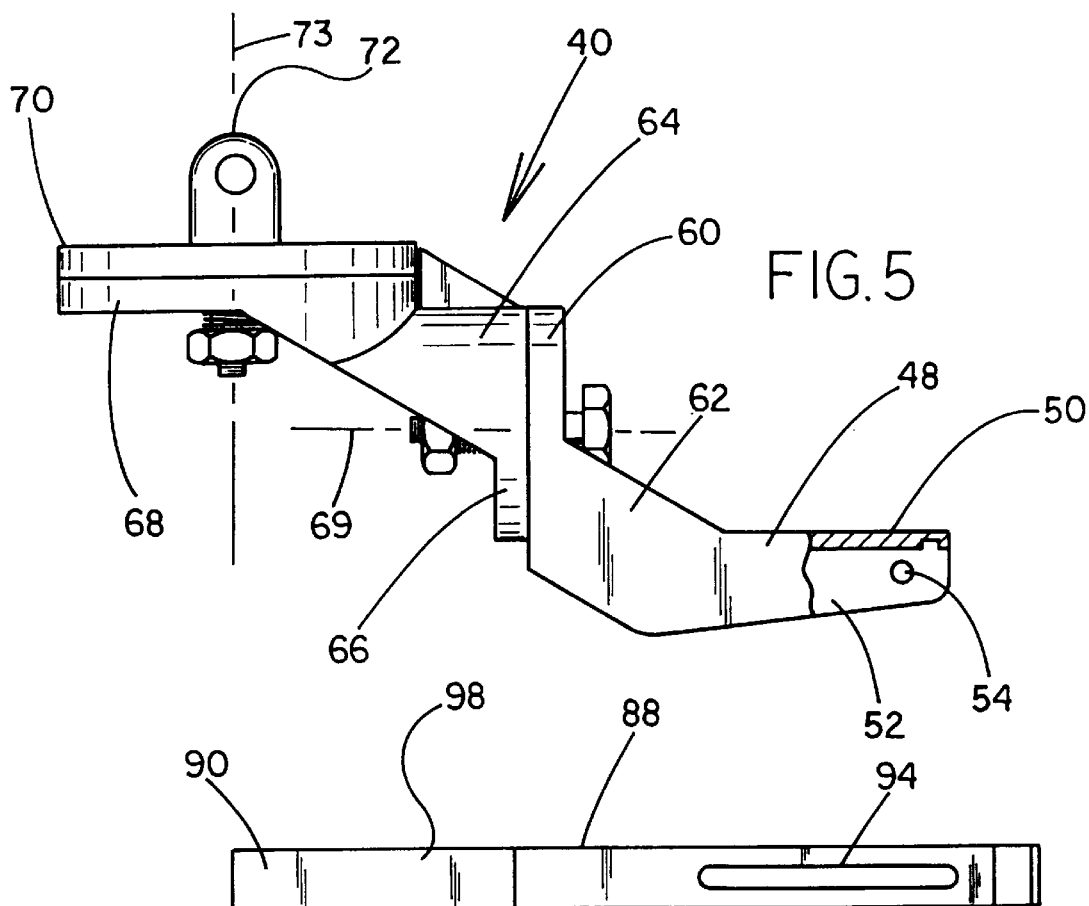
FIG. 5
FIG. 6
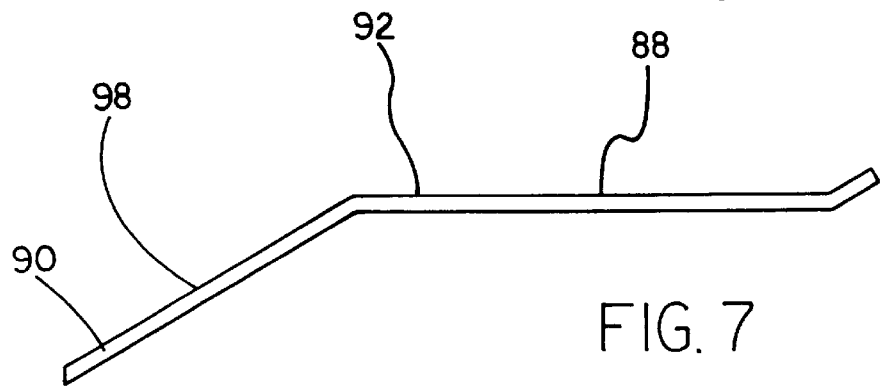
FIG. 7

CHAINSAW BLADE SHARPENER WITH STOP

BACKGROUND OF THE INVENTION

1. Field of the Invention

The present invention relates to blade sharpeners and more particularly pertains to a new chainsaw blade sharpener with stop for maintaining a chainsaw blade in place while sharpening.

2. Description of the Prior Art

The use of blade sharpeners is known in the prior art. More specifically, blade sharpeners heretofore devised and utilized are known to consist basically of familiar, expected and obvious structural configurations, notwithstanding the myriad of designs encompassed by the crowded prior art which have been developed for the fulfillment of countless objectives and requirements.

Known prior art blade sharpeners include U.S. Pat. No. 5,107,726; U.S. Pat. No. 4,966,055; U.S. Pat. Des. No. 250,086; U.S. Pat. No. 4,864,897; U.S. Pat. No. 4,843,718; and U.S. Pat. No. 5,156,071.

In these respects, the chainsaw blade sharpener with stop according to the present invention substantially departs from the conventional concepts and designs of the prior art, and in so doing provides an apparatus primarily developed for the purpose of maintaining a chainsaw blade in place while sharpening.

SUMMARY OF THE INVENTION

In view of the foregoing disadvantages inherent in the known types of blade sharpeners now present in the prior art, the present invention provides a new chainsaw blade sharpener with stop construction wherein the same can be utilized for maintaining a chainsaw blade in place while sharpening.

The general purpose of the present invention, which will be described subsequently in greater detail, is to provide a new chainsaw blade sharpener with stop apparatus and method which has many of the advantages of the blade sharpeners mentioned heretofore and many novel features that result in a new chainsaw blade sharpener with stop which is not anticipated, rendered obvious, suggested, or even implied by any of the prior art blade sharpeners, either alone or in any combination thereof.

To attain this, the present invention generally comprises a clamping assembly including an angle iron base having a horizontal portion with a generally planar rectangular configuration. A pair of bores are adapted for being bolted to a horizontal recipient surface. Associated therewith is a vertical portion with a generally planar rectangular configuration similar to the horizontal portion. The clamping assembly further includes a clamping plate with a generally planar rectangular configuration having a size similar to that of the vertical portion of the base. A pair of horizontally oriented bores are formed in the vertical portion of the base and the clamping plate. Screwably mounted through the bores are a pair of eyebolts for maintaining the clamping plate in parallel relationship with the vertical portion of the base. This is preferably accomplished via wing nuts, as shown in FIG. 8. As shown in such Figure, a pair of elastomeric O-ring bushings are positioned about the eyebolts and between the vertical portion of the base and the clamping plate. Further, a pair of elastomeric nibs are mounted on the clamping plate below the bores thereof for engaging the vertical portion of the base. As best shown in FIGS. 1–3, the clamping assembly includes a pivot tube mounted on the clamping plate in coaxial relationship with eyelets of the eyebolts. A U-shaped pivot bar is pivotally coupled within the pivot tube and situated through the eyelets of the eyebolts. The pivot bar is configured for selectively clamping the clamping plate against the vertical portion of the base to secure a chainsaw blade therein. Next provided is a file mounting assembly including a T-shaped support having a lower extent coupled to the vertical portion of the base. The file mounting assembly further includes a saddle having a generally planar rectangular horizontal part and a pair of side parts coupled to opposite sides of the horizontal part and depending therefrom. As shown in FIG. 5, a pair of coaxially aligned pivot apertures are formed in the side parts adjacent a first end of the horizontal part for pivotally coupling with a pair of pins extending from sides of an upper extent of the T-shaped support. Note FIG. 9. The saddle is thus adapted for being selectively pivoted about a horizontal axis perpendicular with a plane in which the vertical portion of the base resides. The file mounting assembly further includes a generally planar circular vertical portion fixedly coupled to a second end of the horizontal part of the saddle. As shown in FIGS. 2 & 5, the vertical portion extends upwardly from the saddle. The file mounting assembly also has an L-shaped pivot including a generally planar circular vertical member rotatably coupled to the vertical part of the saddle. Fixed to a top of the vertical member of the L-shaped pivot is a generally planar circular horizontal member. By this structure, the L-shaped pivot is adapted to pivot about a horizontal axis parallel with the plane in which the vertical portion of the base resides. The file mounting assembly further includes an upper pivot having a generally planar circular configuration and a pair of diametrically disposed apertured tabs extending upwardly therefrom. The upper pivot is pivotally coupled to the horizontal member of the L-shared pivot about a vertical axis. Also included is a file mechanism having a slider bar slidably situated within the aperture tabs of the upper pivot of the file mounting assembly, as shown in FIG. 1. A pair of generally L-shaped arms have top ends fixed to opposite ends of the slider bar and depending therefrom. A cross bar is coupled between central extents of the L-shaped arms for strengthening purposes. Next provided is a file with a circular cross-section along a length thereof. Such file is removably coupled between bottom ends of the L-shaped arms for sharpening the chainsaw blade. Finally, a chain stop is provided including a strip with a horizontal extent having an elongated slot formed therein adjacent to a first end thereof. See FIG. 6. Such slot serves for being slidably coupled to a tab coupled to the first end of the horizontal part of the saddle of the file mounting assembly, as shown in FIG. 2. As shown in FIG. 7, the chain holder further includes an angled extent extending downwardly and outwardly from the horizontal extent in coplanar relationship for abutting the chainsaw blade.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting is to the scope of the invention in any way.

It is therefore an object of the present invention to provide a new chainsaw blade sharpener with stop apparatus and method which has many of the advantages of the blade sharpeners mentioned heretofore and many novel features that result in a new chainsaw blade sharpener with stop which is not anticipated, rendered obvious, suggested, or even implied by any of the prior art blade sharpeners, either alone or in any combination thereof.

It is another object of the present invention to provide a new chainsaw blade sharpener with stop which may be easily and efficiently manufactured and marketed.

It is a further object of the present invention to provide a new chainsaw blade sharpener with stop which is of a durable and reliable construction.

An even further object of the present invention is to provide a new chainsaw blade sharpener with stop which is susceptible of a low cost of manufacture with regard to both materials arid labor, and which accordingly is then susceptible of low prices of sale to the consuming public, thereby making such chainsaw blade sharpener with stop economically available to the buying public.

Still yet another object of the present invention is to provide a new chainsaw blade sharpener with stop which provides in the apparatuses and methods of the prior art some of the advantages thereof, while simultaneously overcoming some of the disadvantages normally associated therewith.

Still another object of the present invention is to provide a new chainsaw blade sharpener with stop for maintaining a chainsaw blade in place while sharpening.

Even still another object of the present invention is to provide a new chainsaw blade sharpener with stop that includes a clamping assembly adapted for being mounted to a recipient surface and adapted to clamp opposite sides of a chainsaw blade. Also included is a file mounting assembly fixed with respect to the clamping assembly. Next provided is a file slidably coupled to the file mounting assembly. A chain stop is mounted on the file mounting assembly and is adapted for abutting a side of a tooth of the chainsaw blade opposite that which is sharpened by the file.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an end view of a new chainsaw blade sharpener with stop according to the present invention.

FIG. 2 is a view taken along line 2—2 of FIG. 1.

FIG. 5 is a side view of the saddle, L-shaped pivot, and upper pivot of the file mounting assembly of the present invention.

FIG. 6 is a top view of the stop of the present invention.

FIG. 7 is a side view of the stop of the present invention.

DESCRIPTION OF THE PREFERRED EMBODIMENT

Figure 3:
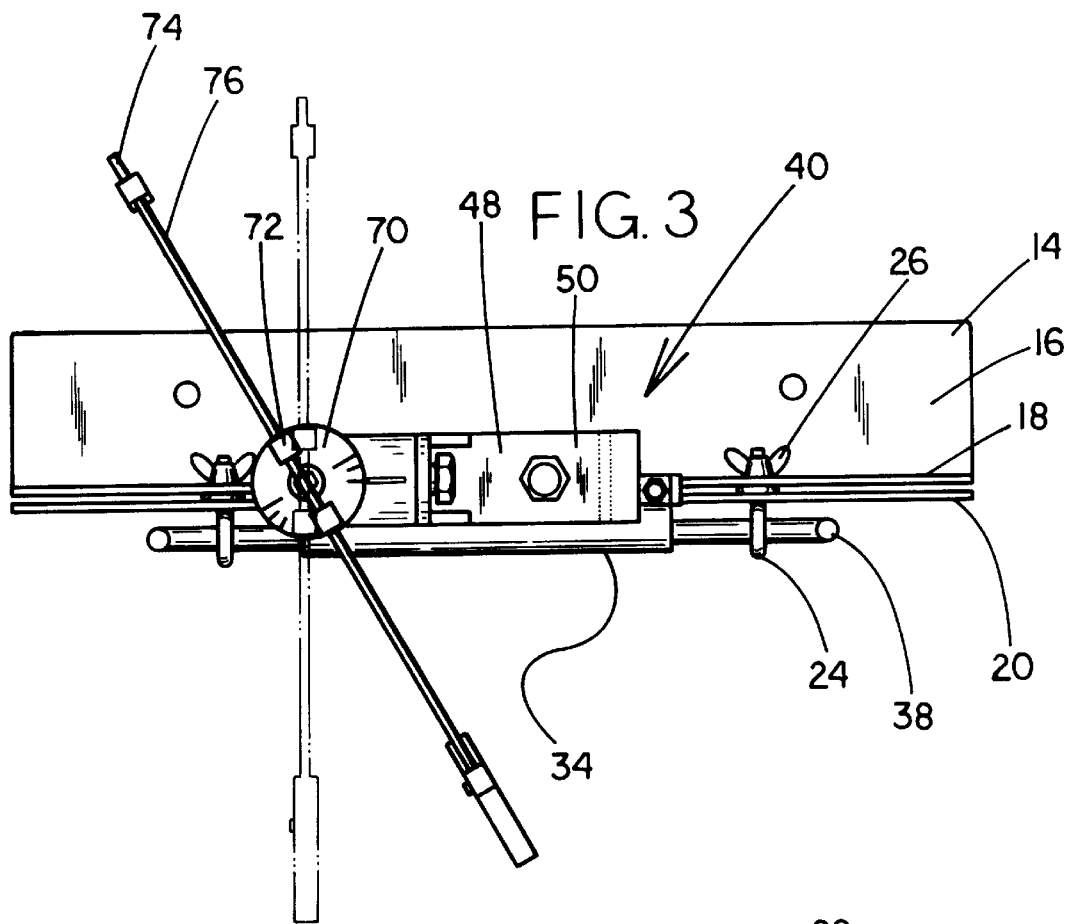
FIG. 3 is a view taken along line 3—3 of FIG. 2.
Figure 4:
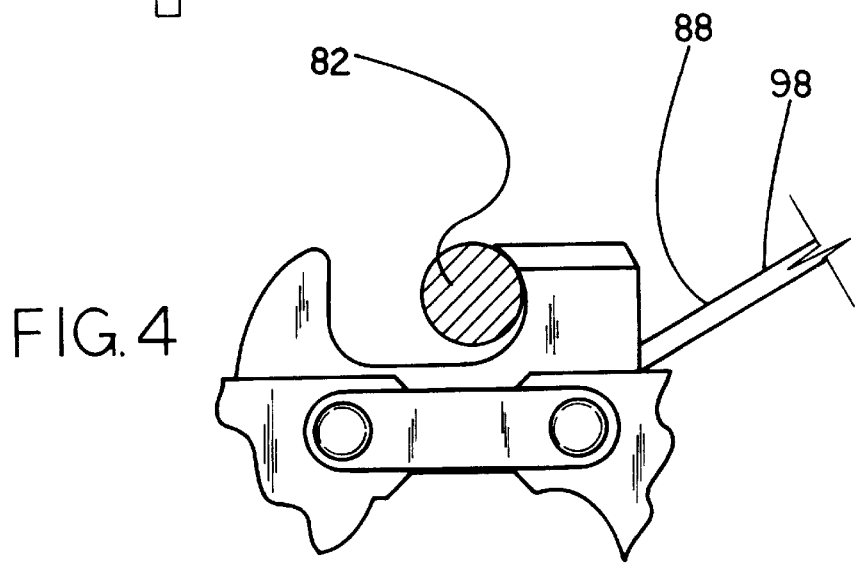
FIG. 4 is a detailed side view of the present invention with one of the teeth of the chainsaw blade being sharpened.

With reference now to the drawings, and in particular to FIGS. 1 through 10 thereof, a new chainsaw blade sharpener with stop embodying the principles and concepts of the present invention and generally designated by the reference numeral 10 will be described.

The present invention, designated as numeral 10, comprises a clamping assembly 12 including an angle iron base 14 having a horizontal portion 16 with a generally planar rectangular configuration. A pair of bores of the horizontal portion 16 are adapted for being bolted to a horizontal recipient surface. Associated therewith is a vertical portion 18 with a generally planar rectangular configuration similar to the horizontal portion 16.

Figure 8:
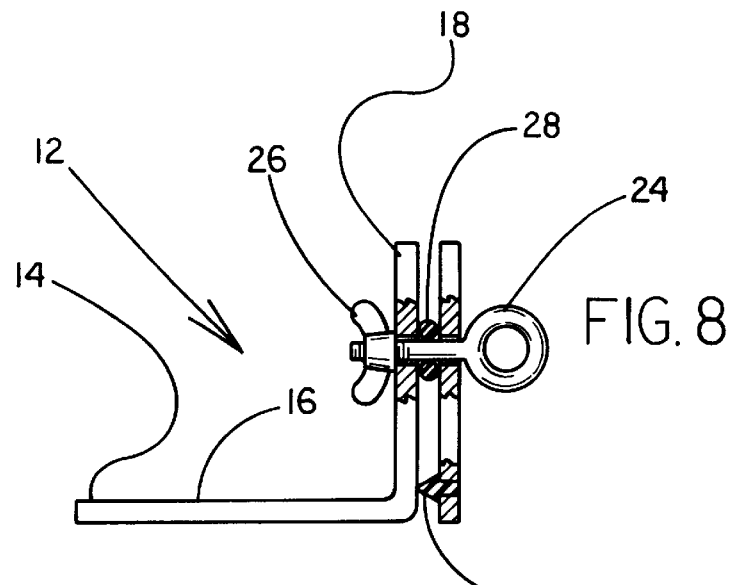
FIG. 8 is a side partially cross-sectional view of the base and the clamping plate of the clamping assembly of the present invention.
Figure 9:
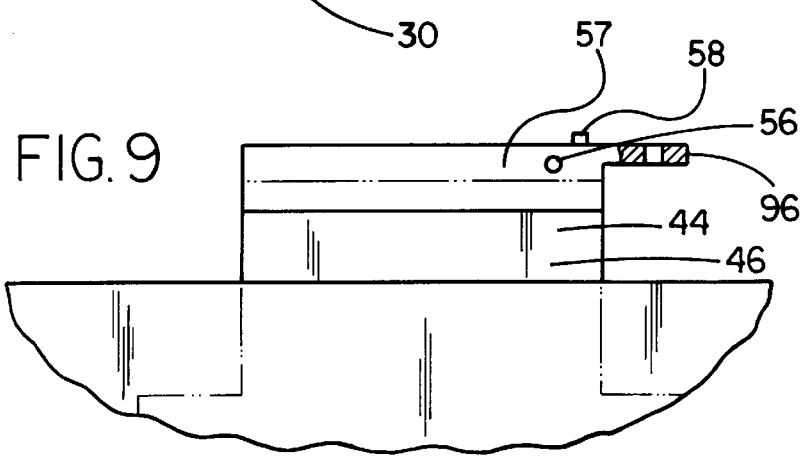
FIG. 9 is a side view of the T-shaped support of the file mounting assembly of the present invention.
Figure 10:
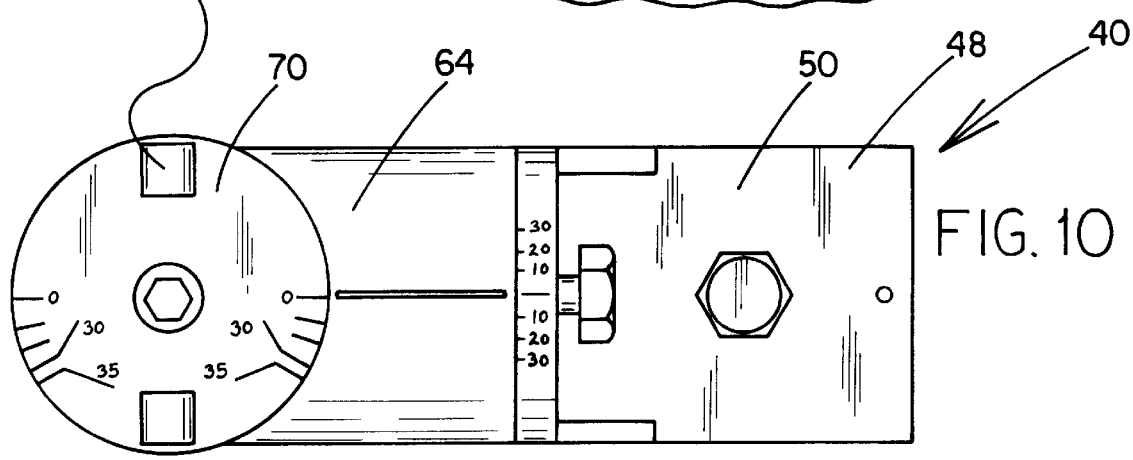
FIG. 10 is a top view of the file mounting assembly of the present invention.

The clamping assembly 12 further includes a clamping plate 20 with a generally planar rectangular configuration having a size similar to that of the vertical portion 18 of the base 14. A pair of horizontally oriented bores are formed in the vertical portion 18 of the base 14 and the clamping plate 20. Screwably mounted through the bores are a pair of eyebolts 24 for maintaining the clamping plate 20 in parallel relationship with the vertical portion 18 of the base 14. This is preferably accomplished via wing nuts 26, as shown in FIG. 8. As shown in such Figure, a pair of elastomeric O-ring bushings 28 are positioned about the eyebolts 24 and between the vertical portion 18 of the base 14 and the clamping plate 20. Further, a pair of elastomeric nibs 30 are mounted on the clamping plate 20 below the bores thereof for engaging the vertical portion 18 of the base 14.

As best shown in FIGS. 1–3, the clamping assembly 12 includes a pivot tube 34 mounted on the clamping plate 20 in coaxial relationship with eyelets of the eyebolts 24. A U-shaped pivot bar 38 is pivotally coupled within the pivot tube 34 and situated through the eyelets of the eyebolts 24. The pivot bar 38 is configured for selectively clamping the clamping plate 20 against the vertical portion 18 of the base 14 to secure a chainsaw blade therebetween. To accomplish this, a pair of portions of the U-shaped bar 38 which remain within the eyelets of the eyebolts 24 are offset with respect to the remaining portions of the pivot bar 38.

Next provided is a file mounting assembly 40 including a T-shaped support 44 having a lower extent 46 coupled to the vertical portion 18 of the base 14. The file mounting assembly 40 further includes a saddle 48 having a generally planar rectangular horizontal part 50 and a pair of side parts 52 coupled to opposite sides of the horizontal part 50 and depending therefrom. As shown in FIG. 5, a pair of coaxially aligned pivot apertures 54 are formed in the side parts 52 adjacent a first end of the horizontal part 50 for pivotally coupling with a pair of pins 56 extending from sides of an upper extent 57 of the T-shaped support 44. Note FIG. 9. The saddle 48 is thus adapted for being selectively pivoted about a horizontal axis 59 perpendicular with a plane in which the vertical portion 18 of the base 14 resides. In order to control such pivoting, a spring 58 is preferably positioned between the T-shaped support 44 and the saddle 48. Working against the spring 58 is a bolt threadedly engaged with a threaded bore formed in the horizontal part of the saddle 48 on a side of the pivot pins and apertures opposite with respect to the spring 58.

The file mounting assembly 40 further includes a generally planar circular vertical portion 60 fixedly coupled to a second end of the horizontal part 50 of the saddle 48. As shown in FIGS. 2 & 5, the vertical portion 60 extends upwardly from the saddle 48. Ideally, supports 62 are integrally formed between the vertical portion 60 and the saddle 48 for strengthening purposes.

The file mounting assembly 40 also has an L-shaped pivot 64 including a generally planar circular vertical member 66 rotatably coupled to the vertical part of the saddle 48. Fixed to a top of the vertical member 66 of the L-shaped pivot 64 is a generally planar circular horizontal member 68. By this structure, the L-shaped pivot 64 is adapted to pivot about a horizontal axis 69 parallel with the plane in which the vertical portion 18 of the base 14 resides. As shown in FIGS. 2 & 5, such pivotal coupling is effected by way of a bolt inserted through central apertures formed in the vertical member 66 of the L-shaped pivot 64 and the vertical portion of the saddle 48. A spring may be positioned about such bolt in order to afford a desired frictional relationship between the L-shaped pivot 64 and saddle 48.

The file mounting assembly 40 further includes an upper pivot 70 having a generally planar circular configuration and a pair of diametrically disposed apertured tabs 72 extending upwardly therefrom. The upper pivot 70 is pivotally coupled to the horizontal member 68 of the L-shaped pivot 64 about a vertical axis 73. This is preferably accomplished in a manner similar to the pivotal coupling between the L-shaped pivot 64 and the saddle 48. Further, measurement indicia is employed between each of the moving components as shown in the Figures.

Also included is a file mechanism 74 having a slider bar 76 slidably situated within the aperture tabs 72 of the upper pivot 70 of the file mounting assembly 40, as shown in FIG. 1. A pair of generally L-shaped arms 78 have top ends fixed to opposite ends of the slider bar 76 and depend therefrom. A cross bar 80 is coupled between central extents of the L-shaped arms 78 for strengthening purposes. Next provided is a file 82 with a circular cross-section along a length thereof. Such file 82 is removably coupled between bottom ends of the L-shaped arms 78 for sharpening the chainsaw blade. This removable coupling is afforded via a pair of set screws 86. As shown in FIG. 1, one of the L-shaped arms 78 has a C-shaped handle formed therein.

Finally, a chain stop 88 is provided including a strip 90 with a horizontal extent 92 having an elongated slot 94 formed therein adjacent to a first end thereof. See FIG. 6. Such slot 94 serves for being slidably coupled to a tab 96 formed on the first end of the horizontal part of the saddle 48 of the file mounting assembly via a bolt, as shown in FIG. 2. It should be noted that the strip preferably slides beneath the top extent of the T-shaped support 44 of the file mounting assembly 40. As shown in FIG. 7, the chain holder further includes an angled extent 98 extending downwardly and outwardly from the horizontal extent 92 in coplanar relationship for abutting the chainsaw blade. Note FIG. 4. Such abutment is preferably effected on a side of one of the teeth of the chainsaw blade opposite that which is engaged by the file. This is critical for preventing slippage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chainsaw blade sharpening system comprising, in combination:

a clamping assembly including an angle iron base having a horizontal portion with a generally planar rectangular configuration and a pair of bores adapted for being bolted to a horizontal recipient surface and a vertical portion with a generally planar rectangular configuration heaving a pair of horizontally spaced bores formed therein, the clamping assembly further including a clamping plate with a generally planar rectangular configuration having a size similar to that of the vertical portion of the base and a pair of horizontally oriented bores formed therein, a pair of eyebolts each screwably mounted through the bores of the vertical portion of the base and the clamping plate via a wing nut for maintaining the clamping plate in parallel relationship with the vertical portion of the base, a pair of elastomeric O-ring bushings positioned about the eyebolts and between the vertical portion of the base and the clamping plate, a pair of elastomeric nibs mounted on the clamping plate below the bores thereof for engaging the vertical portion of the base, a pivot tube mounted on the clamping plate in coaxial relationship with eyelets of the eyebolts, and a U-shaped pivot bar pivotally coupled within the pivot tube and situated through the eyelets of the eyebolts for selectively clamping the clamping plate against the vertical portion of the base for securing a chainsaw blade therein;

a file mounting assembly including a T-shaped support having a lower extent coupled to the vertical portion of the base in coplanar relationship therewith and opposite the clamping plate, the file mounting assembly further including a saddle having a generally planar rectangular horizontal part, a pair of side parts coupled to opposite sides of the horizontal part and depending therefrom, a pair of coaxially aligned pivot apertures formed in the side parts adjacent a first end of the horizontal part for pivotally coupling with a pair of pins extending from sides of an upper extent of the T-shaped support for being selectively pivoted about a horizontal axis perpendicular with a plane in which the vertical portion of the base resides, and a generally planar circular vertical portion fixedly coupled to a second end of the horizontal part of the saddle and extending upwardly therefrom, the file mounting assembly further including an L-shaped pivot including a generally planar circular vertical member rotatably coupled to a vertical part of the saddle and a generally planar circular horizontal member fixed to a top of the vertical member of the L-shaped pivot such that the L-shaped pivot is adapted to pivot about a horizontal axis parallel with the plane in which the vertical portion of the base resides, the file mounting assembly further including an upper pivot having a generally planar circular configuration and a pair of diametrically disposed apertured tabs extending upwardly therefrom, the upper pivot being pivotally coupled to the horizontal member of the L-shaped pivot about a vertical axis;

a file mechanism including a slider bar slidably situated within the aperture tabs of the upper pivot of the file in mounting assembly, a pair of generally L-shaped arms having top ends fixed to opposite ends of the slider bar and depending therefrom, a cross bar coupled between central extents of the L-shaped arms for strengthening purposes, and a file with a circular cross-section along a length thereof removably coupled between bottom ends of the L-shaped arms for sharpening the chainsaw blade; and a chain stop including a strip with a horizontal extent having an elongated slot formed therein adjacent to a first end thereof for being slidably coupled to a tab coupled to the first end of a horizontal part of the saddle of the file mounting assembly, the chain stop further including an angled extent extending downwardly and outwardly from the horizontal extent in coplanar relationship for abutting the chainsaw blade.

2. A chainsaw blade sharpening system comprising:

a clamping assembly adapted for being mounted to a recipient surface and adapted to clamp opposite sides of a chainsaw blade;

a file mounting assembly positioned adjacent to the clamping assembly;

a file slidably coupled to the file mounting assembly; and a chain stop for abutting a side of a tooth of the chainsaw blade opposite that which is sharpened by the files;

wherein the clamping assembly includes a base and a clamping plate with a bushing formed therebetween, wherein the clamping plate is adapted to be urged toward the base against the bushing.

3. A chainsaw blade sharpening system as set forth in claim 2 wherein the chain stop is slidably mounted to the file mounting assembly.

4. A chainsaw blade sharpening system as set forth in claim 2 wherein the chain stop has a horizontal extent and an angled extent.

5. A chainsaw blade sharpening system as set forth in claim 2 wherein the file is pivotable about a vertical axis, a first horizontal axis in parallel with the chainsaw blade, and a second horizontal axis in perpendicular relationship with the chainsaw blade.

6. A chainsaw blade sharpening system as set forth in claim 2 wherein the clamping plate is urged toward the base by a pivot arm.

* * * * *